US008364191B2

(12) United States Patent
Becker et al.

(10) Patent No.: US 8,364,191 B2
(45) Date of Patent: Jan. 29, 2013

(54) GROUP CALL MANAGEMENT

(75) Inventors: Joerg Becker, Markdorf (DE); Martin Sauter, Markdorf (DE); Timothy Longman, Chester (GB)

(73) Assignee: Apple Inc., Cupertino, CA (US)

( * ) Notice: Subject to any disclaimer, the term of this patent is extended or adjusted under 35 U.S.C. 154(b) by 1058 days.

(21) Appl. No.: 11/966,690

(22) Filed: Dec. 28, 2007

(65) Prior Publication Data

US 2009/0170488 A1 Jul. 2, 2009

(51) Int. Cl.
*H04B 7/00* (2006.01)
(52) U.S. Cl. .................. 455/519; 455/416; 455/438
(58) Field of Classification Search .................. 455/416, 455/518, 519
See application file for complete search history.

(56) References Cited

U.S. PATENT DOCUMENTS

| | | | |
|---|---|---|---|
| 5,970,417 A | 10/1999 | Toyryla | |
| 6,219,548 B1 | 4/2001 | Feltner | |
| 2003/0117976 A1* | 6/2003 | Needham et al. | 370/331 |
| 2004/0180682 A1* | 9/2004 | Kim | 455/518 |
| 2010/0029290 A1* | 2/2010 | Barbaresi et al. | 455/450 |

FOREIGN PATENT DOCUMENTS

| | | |
|---|---|---|
| EP | 1871139 A | 12/2007 |
| WO | WO-01/31964 A | 5/2001 |
| WO | WO-01/31964 A1 | 5/2001 |
| WO | WO-00/38439 A | 6/2001 |
| WO | WO-01/76300 A | 11/2001 |
| WO | WO-01/869750 A | 11/2001 |

OTHER PUBLICATIONS

Search Report and Written Opinion in PCT/EP2008/068333, Aug. 27, 2009.
"Digital Cellular Telecommunications System (Phase 2+); Voice Group Call system (VGCS); . . .", vol. 3 CN1, No. V7.8.0, Jun. 1, 2007, pp. 1-154.

* cited by examiner

*Primary Examiner* — Vladimir Magloire
(74) *Attorney, Agent, or Firm* — Meyertons, Hood, Kivlin, Kowert & Goetzel, P.C.; Stephen J. Curran

(57) ABSTRACT

A method of managing a group call involving a number of mobile communications devices include a network node identifying a radio access node adjacent a first radio access node. The method also includes a serving node creating the Group Call Area on basis of the first and adjacent radio access nodes. The method also includes establishing a signalling channel within a cell corresponding to the adjacent radio access node. The signalling channel includes an identifier corresponding to the Group Call area. The radio access nodes, or base stations, that have established a data communications channel with the mobile communications device have traffic and signalling channels established therein and are marked as an active cell of the Group Call Area.

12 Claims, 7 Drawing Sheets

GROUP CALL MANAGEMENT

FIELD OF THE INVENTION

The present invention relates to mobile telecommunications networks and to the coordination of group calls involving mobile terminals operating in such networks; embodiments of the invention are particularly, but not exclusively, suited to coordinating group calls when members of the group move between cells of the mobile network.

BACKGROUND OF THE INVENTION

Conventional mobile telecommunications networks, for example, digital cellular telecommunication networks according to the GSM Standard (Global System for Mobile Communications) provide voice broadcast services that permit a subscriber to initiate a group broadcast call directed to a group of other subscribers. Such voice broadcast service for GSM systems is specified in GSM Standard 03.68 and a related GSM Standard, namely GSM 03.69.

Typically, a particular group is identified by a group ID. A common control channel (for example the notification channel NCH in GSM) broadcasts a notification message including the group ID and a description of the channel being used for the group call in the network. Thus, users having the correct group ID stored in their mobile terminals, for example stored in the SIM (Subscriber Identity Module) card of a GSM mobile unit, can recognize the notification message, and can then connect to the group call by tuning to the channel described in the notification message. Furthermore in conventional Voice Group Call Service (VGCS) systems a given user can request and obtain an uplink channel, thereby permitting the user to speak to the group. A given mobile user must have a subscription with the group call service provider in order to be permitted to initiate a group call or participate in a group call.

Group call attributes including, for example, a listing of the cells in which the group call is broadcasted (the Group Call Area) are conventionally compiled in a separate network node database, for example the Group Call Register (GCR) in GSM networks. The group call register is typically associated with a Mobile Switching Centre (MSC) in GSM systems.

A particular problem is encountered with group calls when multiple group calls, each having the same group ID, are conducted within overlapping cells. In one conventional arrangement, a mobile station wanting to join a group call will select whichever of the notification broadcast messages that are broadcast on the notification channel in the cell is first received by the mobile device, so that selection of a group to join can be viewed as random. In relation to mobile devices that are already engaged in a group call at the time of moving into an overlapping cell, International patent application having publication number WO0131964 describes a mechanism by which these groups will be merged so as to form a single group call (with a larger number of participants), whilst other known mechanisms constrain mobile devices to remain with the group to which they were associated prior to moving into the cell. In all of these configurations, there is no means of intelligently selecting between group calls: selection is either performed randomly, or hard wired based on initial group designations, or not possible. In addition there is no means of restricting members of a group call: provided a mobile user has a subscription with the group call service provider, its terminal can join a group call.

Another problem is encountered when mobile devices move between cells: subscribers of conventional group call services are typically allowed to move from cell to cell while remaining in the group call, assuming that the group call is broadcast in each new cell into which the subscriber roams. However, if the group call is not being broadcasted in the new cell, then the group call will no longer be available to the subscriber. Further, changing cells often requires a short interruption of the subscriber's reception of the group call until the subscriber's mobile terminal has listened to the notification channel in the new cell and tuned to the proper group call channel in the new cell.

SUMMARY OF THE INVENTION

In accordance with a first aspect of the present invention there is provided a method of setting up a call group for participation in a group call by a plurality of mobile devices in a mobile telecommunications network, the mobile telecommunications network comprising a serving node operable to transceive data to and from the mobile telecommunications devices, the method comprising:

receiving, at a serving node, data indicative of a group identifier from a said mobile terminal registered with the mobile telecommunications network; and defining a Group Call Area using the received group identifier, the defined Group Call Area being accessible by the serving node so as to enable the serving node to discriminate one call group registered with said telecommunications network from another call group registered with said telecommunications network.

Thus with embodiments of the invention Group Call Areas are defined on the basis of an identifier that is unique to the group; this enables two or more group calls having the same group calling identifier to exist in the same cell without interfering with one another. Conveniently the telecommunications network holds data identifying group call numbers, and at least one of the group call numbers is reserved for dynamic group calls. As a result the group call number can be used to identify the group call as a static type of group call or a dynamic type of group call, and the processes performed by the network selected accordingly.

According to a further aspect of the present invention there is provided a method of managing a group call involving a plurality of mobile communications devices, said plurality of mobile communications devices being registered with a telecommunications network via a serving node, the serving node being operable to transceive data to and from a plurality of radio access nodes so as to communicate with said registered mobile communications devices, in which at least a first of said radio access nodes has established a data communications channel with a mobile communications device of the plurality for conducting the group call, the method comprising:

identifying a radio access node adjacent the first radio access node;

defining the Group Call Area on basis of the first and adjacent radio access nodes; and establishing a signalling channel within a cell corresponding to said adjacent radio access node, said signalling channel having an identifier corresponding to the Group Call Area.

The telecommunications network comprises a plurality of radio access nodes in the form of base stations; the serving node—or switch—is operable to transceive data to and from the base stations as per conventional network arrangements. Whichever base station has established a data communications channel with the mobile communications device has traffic and signalling channels established therein and is marked as an active cell of the Group Call Area;

In addition, base stations adjacent the active base station are added to the Group Call Area, signalling channels are established in these adjacent cells, and each signalling channel has an identifier corresponding to the Group Call Area. This method of channel allocation and deallocation provides a solution to the problem in the prior art in which channels have to be created as a mobile station moves into a new cell; by contrast, and because a signalling channel in any potential "next" cell has already been established, it is relatively straightforward to allocate a traffic channel therein.

Conveniently traffic channels can be created in response to a signalling request message from the mobile communications device identifying the adjacent radio access node: this indicates that the mobile device has moved into one of the previously designated adjacent cells and thus effectively changes the "active" cell to that which received the signalling request message from the mobile device. As the active cell changes, so do the base stations that can be considered adjacent to the "active" cell, and thus the actual Group Call Area. The Group Call Area can be updated by the network in response to traffic deallocation messages sent from a base station in the event that the base station is no longer transceiving data with a mobile device associated with the group call. These deallocation messages can additionally be used to delete cells from the Group Call Area that were adjacent to a cell previously designated the active cell. As a result, in preferred arrangements the Group Call Area includes cells immediately surrounding currently active cells.

According to a further aspect of the present invention there is provided a group call management system for managing a group call involving a plurality of mobile communications devices, said plurality of mobile communications devices being registered with a telecommunications network via a serving node, the serving node being operable to transceive data to and from a plurality of radio access nodes so as to communicate with said registered mobile communications devices, in which at least a first of said radio access nodes has established a data communications channel with a mobile communications device of the plurality for conducting the group call. The group call management system comprises:

a network node arranged to identify a radio access node adjacent the first radio access node in response to a service request message identifying the first radio access node; and means for configuring the Group Call Area on basis of the first and adjacent radio access nodes, wherein at least some said adjacent radio access nodes are arranged to establish a signalling channel, said signalling channel having an identifier corresponding to the Group Call Area.

In one arrangement the serving node comprises the means for configuring the Group Call Area and the group call management system is collectively configured to provide the functionality described above.

It can therefore be seen that embodiments of the invention provide a means of intelligently controlling parties joining a group call and selectively coordinating signalling between cells so as to avoid interruptions to reception of the group call.

Further features and advantages of the invention will become apparent from the following description of preferred embodiments of the invention, given by way of example only, which is made with reference to the accompanying drawings.

DETAILED DESCRIPTION OF THE INVENTION

As described above, embodiments of the invention are concerned with coordinating movement of group calls through a cellular network, in particular with intelligently controlling parties joining a group call and selectively coordinating signalling between cells so as to avoid interruptions to reception of the group call as it moves. In order to appreciate the level at which embodiments of the invention operate, an overview of a Public Land Mobile Network (PLMN) 1, within which such embodiments can operate, will first be described with reference to FIG. 1.

Figure 1:
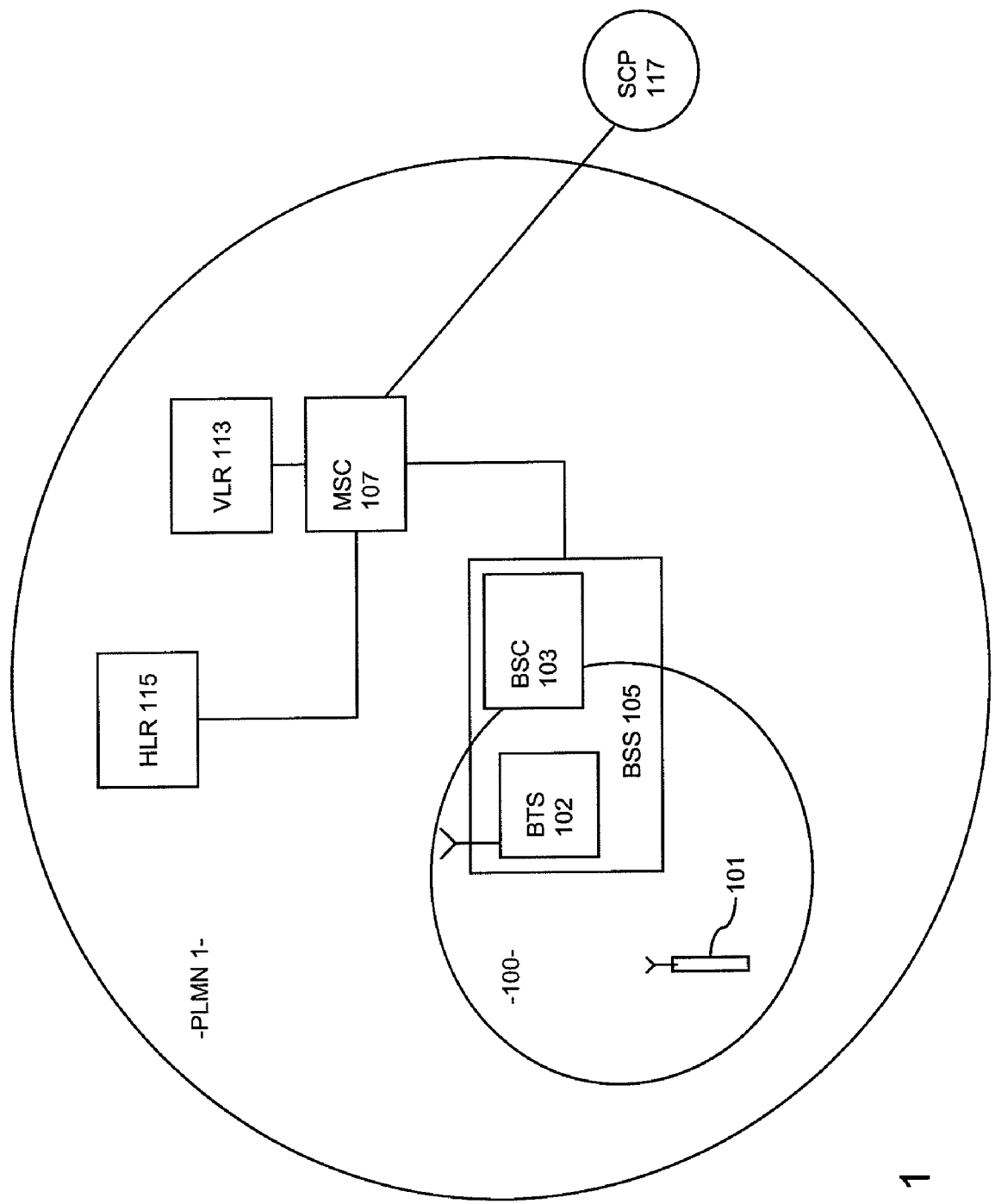
FIG. 1 is a schematic block diagram showing various components of a standard configuration of a mobile network.

The PLMN network shown in FIG. 1 comprises a cellular network such as a GSM or UMTS network (only one cell 100 being shown in FIG. 1). The cell 100 has a limited coverage and is served by the PLMN 1 via a Base Transceiver Station (BTS) 102 and a Base Station Controller (BSC) 103, which form a Base Station System (BSS) 105. The BSC 103 is connected to a Mobile Switching Center (MSC) 107 which is an exchange and is arranged to perform all switching functions for mobile stations such as MS 101 located in a geographical area designated as the MSC area. As shown in FIG. 1, the MSC 107 is connected to a Service Control Point SCP 117 that is arranged, on the basis of the network subscription associated with MS 101, to provide MS 101 with access to various intelligent network services, in this case, a group call service.

In operation, the MSC 107 takes into account the impact of the allocation of radio resources and the mobile nature of the subscribers, and performs procedures required for location registration, hand-over of, and call set-up for, served mobile stations. The MSC 107 is connected to a Home Location Register (HLR) 115, which is a database arranged to manage subscription data relating to mobile subscribers such as MS 101. The PLMN I may include one or several HLRs 115, depending on the number of mobile subscribers, the capacity of the equipment and the organization of the PLMN network 1. The HLR 115 is arranged to store data identifying the location of mobile subscribers managed by each HLR 115 (e.g. in order to be able to route calls thereto); identification numbers attached to each mobile subscription (e.g. International Mobile Subscriber identity (IMSI); Mobile Subscriber ISDN Number (MSISDN)); communication service subscription information, service restrictions (e.g. roaming limitations); general subscriber attributes and preferences; and supplementary service information including parameters associated with these services. In terms of communication between the various components of the PLMN 1, the MSC 107, HLR 115 and SCP 177 may send and receive data via a variety of signaling protocols, including but not limited to, Signaling System Number (SS#7) Mobile Application Part (MAP).

Additionally, the MSC 107 is connected to a Visitor Location Register (VLR) 113, which is arranged, as in known configurations, to receive data from mobile subscribers MS 101 in this MSC area and pass this information onto the HLR 115; additionally the VLR 113 is arranged to receive data from the HLR 115 indicating sets of services and triggers available to MS 101. One of the sets of services available to the MS 101 in an embodiment of the invention is group calls to group ID 888, it being assumed that the subscriber corresponding to MS 101 has subscribed to a group call service that is coordinated by the SCP 117. As a result, call setup requests from the MS 101 that contain group ID 888 have the effect of triggering the MSC 107 to send signalling messages to the SCP 117. In addition, the SCP 117 and MSC 107 are configured with bespoke functionality so as to configure Group Call Areas according to an embodiment of the invention. This will now be described with reference to FIGS. 2-6 for the particular example of a group call being coordinated in relation to train employees travelling on a train from London to Edinburgh.

Figure 2:
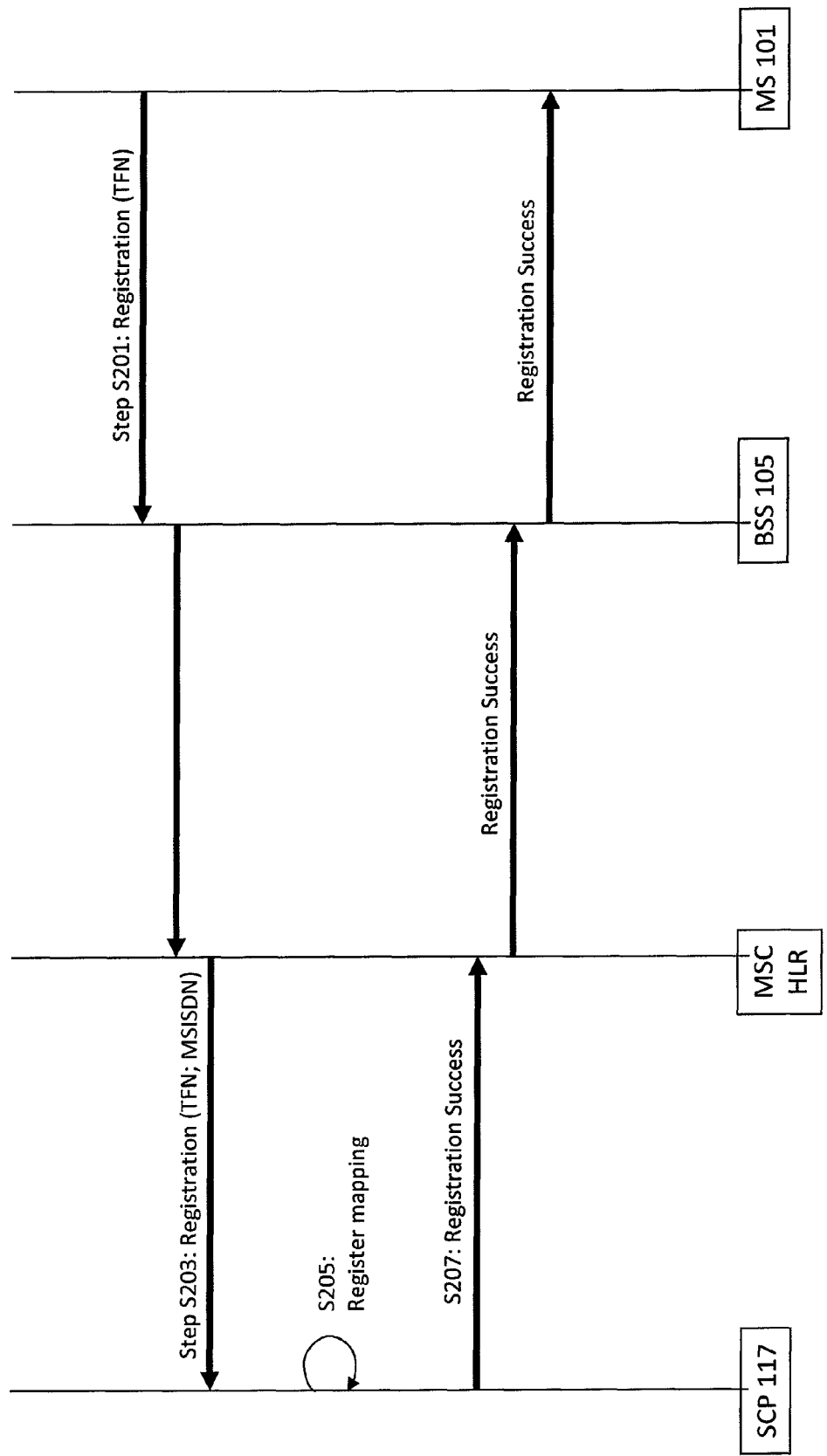
FIG. 2 is a timing diagram showing communication between various of the components shown in FIG. 1 when registering a mobile station for a group call according to an embodiment of the invention.

Starting with FIG. 2, the steps involved in registration of the mobile station 101 with the group call service will be described. At step S201, the mobile station 101 sends a Registration request message, which includes a unique identifier for the group, TFN. In the current example the unique identifier conveniently includes an identity of the train, this having previously been provided to the mobile station 101 (and indeed to other mobile stations corresponding to the personnel on the train). The registration request is forwarded to the MSC 107 via the BSS 105, and this triggers a registration request message to be forwarded to the SCP 117 at step S203. As can be seen from FIG. 2, the registration request message received by the SCP 117 comprises the group identifier TFN and the MSISDN of the individual mobile station 101 from which the registration request originated at step 5201. In the current example the unique identifier TFN identifies a functional number of the particular train, and can be composed by the following parts: call type (train number), train running number and function code (e.g. driver). Thus for example assuming a train to have a train number of 2, a train running number of 00175 and function code of 01, the identifier TFN received by the SCP 117 can be 2 00175-01. It will be appreciated that the identifier can be made up of data identifying other characteristics of the train.

Figure 3:
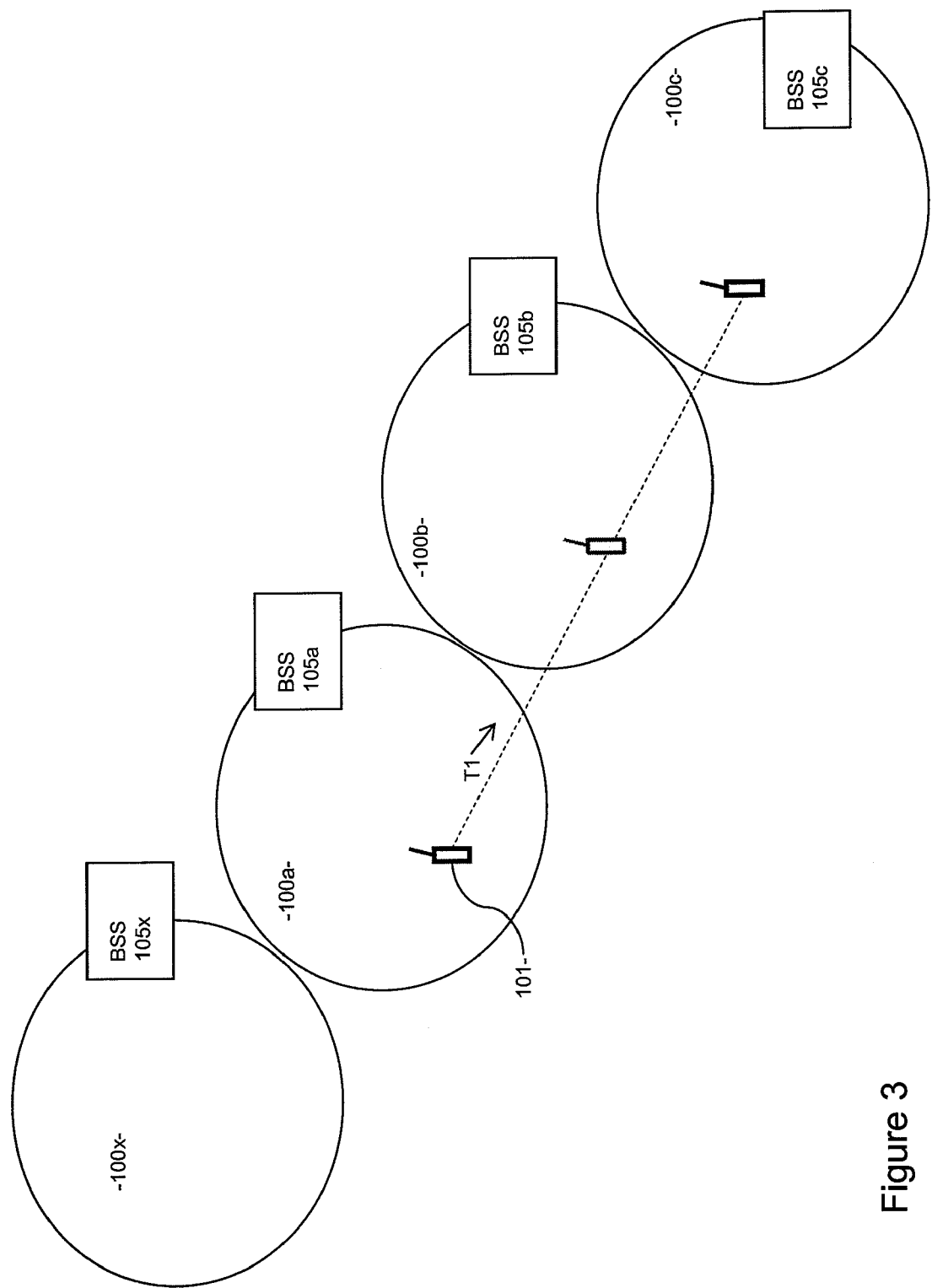
FIG. 3 is a schematic block diagram showing a plurality of cells shown in FIG. 1.

In response to receipt of the MSISDN and TFN information, the SCP 117 firstly checks that this requesting mobile station 101 is authorised to participate in a group service and, if so, updates its mappings between mobile stations and group identities (step S205). These data can then be used in handling subsequent requests for group calls. Assuming registration to be successful, the SCP 117 transmits an acknowledgment message at step S207 to the MSC 107, which sends this back to the mobile station 101 via the BSS 105. Whilst registration in respect of only one mobile station is shown in FIG. 3, it will be appreciated that for arrangements in which registration is a prerequisite to participation in a group call, all such mobile stations will be required to register with the service. It is, however, to be noted that the particular registration process described herein is exemplary only and entirely independent of the processes involved in setting up and managing group calls according to embodiments of the invention. Indeed registration with a group call service can be effected via Over The Air (OTA) SIM updates in one alternative arrangement, whilst embodiments of the invention do not necessarily require all participating mobile devices to have preregistered with a group service (e.g. in the event that the group call is of an open VGCS type).

Figure 4:
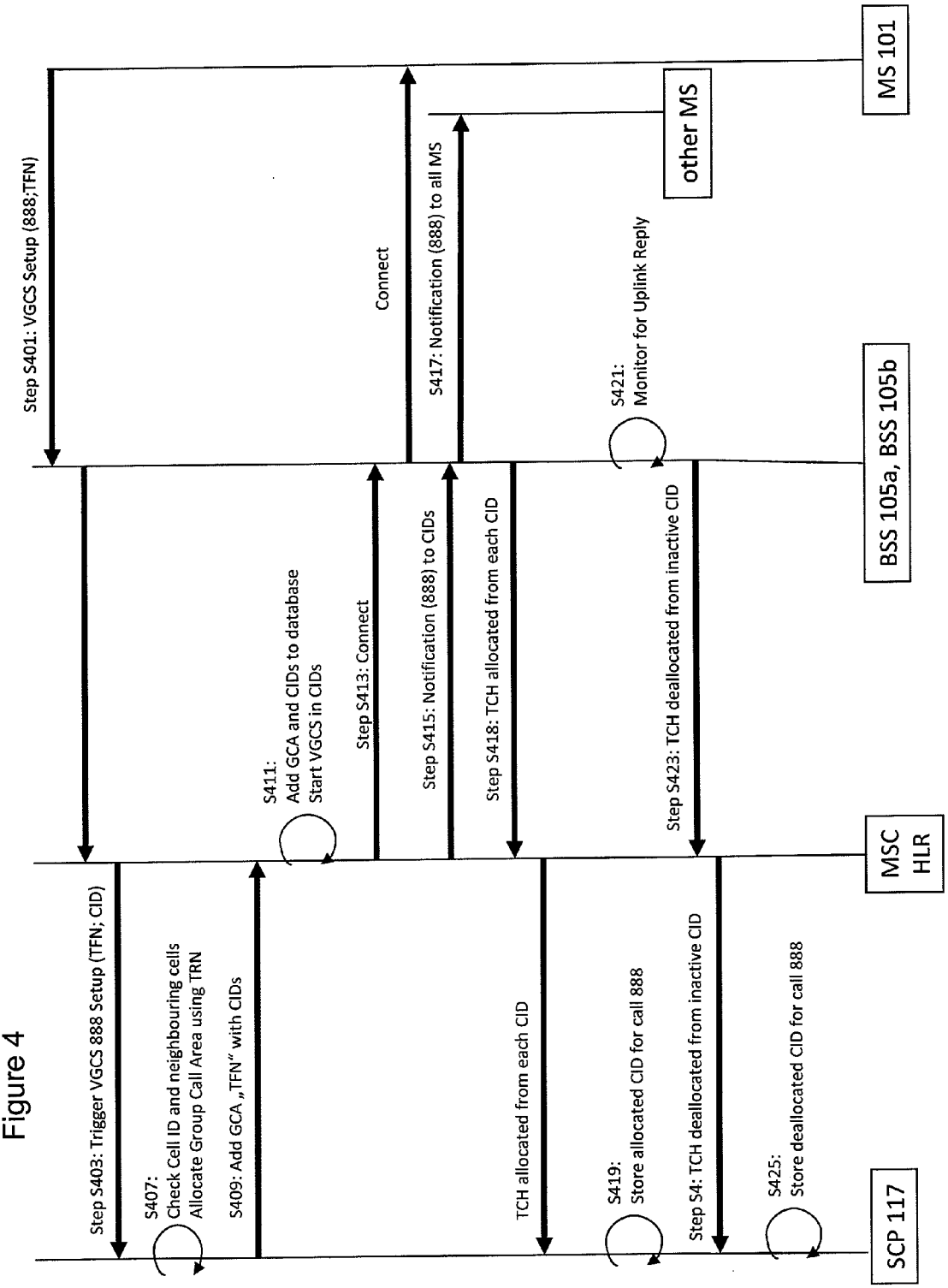
FIG. 4 is a timing diagram showing communication between various of the components shown in FIG. 1 when setting up a group call according to an embodiment of the invention.

Turning now to FIG. 3, in the current example it is assumed that the train is in the process of moving through cells 100*a*, 100*b*, 100*c*, and that a group call request is received from the mobile station 101 when it is located in cell 100*a*. With reference also to FIG. 4, a group call request is received by the mobile station 101 transmitting a standard group call setup message (step S401), the message comprising the unique identifier for this call (TFN), together with the group ID for the call (in this example 888). This is received by the SCP 117, together with the Cell ID (in this case 100*a* corresponding to base station BS 105*a*). At step S407 the SCP 117 performs a look-up of the database holding data indicating ongoing group calls having this group ID (888) and a unique group identity matching that received at step S401. In the current example the SCP 117 is configured to match the train running number portion of the Train Functional Number (TFN), but it will be appreciated that the entire string of the TFN could alternatively be used, or indeed a different part or transformation thereof. In this case no such group call exists, so at step S407 an entry is created in the group call table managed by the SCP 117 for a new call having group identity TFN and group ID 888.

In embodiments of the invention the SCP 117 additionally stores, or has access to, a table listing static group call numbers and dynamic group call numbers. For illustrative purposes it is assumed that group IDs within the range 880-888 have been reserved for dynamic group calls, and, if a group call is determined to correspond to a dynamic group call, the functionality invoked of the SCP 117 is different to that which is invoked according to conventional methods for handling dynamic group calls. It is to be noted that static group calls are handled according to conventional methods and are outside of the scope of the present invention.

In the current example the group ID is 888, which indicates a dynamic group call. In response to identifying the group call to be of the dynamic type the SCP 117 identifies all cells that are adjacent to the current cell 100*a*, e.g. by means of a prestored cell configuration map. A message comprising the list of neighbouring cells is subsequently sent to the MSC 107 at step S409, together with the unique group identifier TFN. This message comprises an instruction for the MSC 107 to create a Group Call Area based on these neighbouring and originating cells (step S411). Referring back to FIG. 3, in the current example the cells neighbouring the cell of origin 100*a* are cells 100*x* and 100*b*; accordingly step S411 involves the MSC 107 updating a group call register database held locally by the MSC 107 so as to include this newly created dynamic Group Call Area with cells 100*x*, 100*a*, 100*b*.

At step S413 a call connection message is sent to the mobile station 101 so as to start the dynamic group call. In addition a notification message comprising the dynamic group ID 888 is broadcast to all mobile stations within the Group Call Area, which in this example comprises cells 100*x*, 100*a* and 100*b* (step S417), the BSS 105*a*, 105*b* having previously been instructed to set up signalling and traffic channels in response to the notification received at step S415. This message is broadcast on the Notification channel NCH and enables all other mobile stations having the unique group identifier TFN and subscribing to group call 888 to join the call in the call group area 100x, 100a, 100b, and thereby make use of the traffic channels established therein.

The steps relating to the processes performed in respect of cells 100x and 100b—i.e. those adjacent to the cell 100a in which the group call originated—will now be described in relation to cell 100b. Having established the traffic channel in cell 100b, base station BSS 105b sends a standard TCH allocation message to the SCP 117 via the MSC 107 (step S418), causing the SCP 117 to store an entry in its database for this neighbouring cell 100b (step S419). Meanwhile, and in accordance with standard methods, the BSS 105b monitors for a reply on the uplink traffic channel from a mobile station within cell 100b for a predetermined time period (step S421). In the event that there is no response within this period, the BSS 105b transmits a deallocation traffic channel notification message to the SCP 117 via the MSC 107 (step S423), causing the SCP 117 to update its entry for traffic channel in cell 100b as deallocated. It is to be noted that whilst the traffic channel is removed, the signalling channel is not pulled down; furthermore the deallocation of the traffic channel has no bearing on the Group Call Area—this remaining as 100x, 100a, 100b.

Group Call Areas created according to embodiments of the invention can therefore be characterised as comprising active cells and passive cells. The active cells are those for which signalling and traffic channels exist, and there are as many active cells as there are cells comprising participants in the group call. The passive cells are those that neighbour the active cells and in respect of which only signalling channels exist. Thus in the current example, for the time in which the train and all personnel thereon are located within cell 100a, there is one active cell (100a) and two passive cells (100x, 100b). This method of channel allocation and deallocation provides a solution to the problem in the prior art in which channels have to be created as a mobile station moves into a new cell, because a signalling channel in any potential "next" cell has already been established, making it relatively straightforward to allocate a traffic channel therein, as will now be described with reference to FIG. 5.

Referring back briefly to FIG. 3, as the train moves along trajectory T1, it enters cell 100b after a certain period of time. As a result of the notification messages transmitted at step S415, cell 100b already has a notification channel associated with this group call (ID 888 and a Group Call Area having identifier 00175). Accordingly the mobile station 101 will detect the existence of the group call having ID 888 via the notification channel as soon as it enters cell 100b; in response the mobile station 101 checks the group ID (888) and the identifier of the Group Call Area (00175) against unique identifiers registered with the mobile station 101. Since, in this case, the mobile station 101 has registered for Group Call Area having identifier 00175, the group call can be conducted in this cell 100b; as a result mobile station 101 subsequently sends a notification response message to the BSS 105b (step S501), the notification response message comprising the Group Call Area (00175) and group ID (888). When received by the BSS 105b, the BSS 105b allocates a traffic channel therein (step S502) and sends notification of the traffic channel allocation to the SCP (step S503) for cell 100b.

Upon receipt of the traffic channel allocation message the SCP 117 identifies all cells that are adjacent to the current cell 100b, again by referring to the prestored cell configuration map as described above in relation to step S407, and updates the status for cell ID 100b as having an active traffic channel therein (step S505). Thereafter, identifiers of cells adjacent to the current cell 100b are sent to the MSC 107, which in this case is cell 100c, with an instruction to the MSC 107 to update the Group Call Area to include this cell 100c (step S507). Upon receipt of this instruction message the MSC 107 updates its table (step S508) and sends a notification message to cell 100c newly added to the Group Call Area (step S509); this causes the BSS 105c to transmit a notification message to all mobile stations in the cell 100c (step S511) and the process then proceeds as described from step S415 in FIG. 4.

Figure 6:
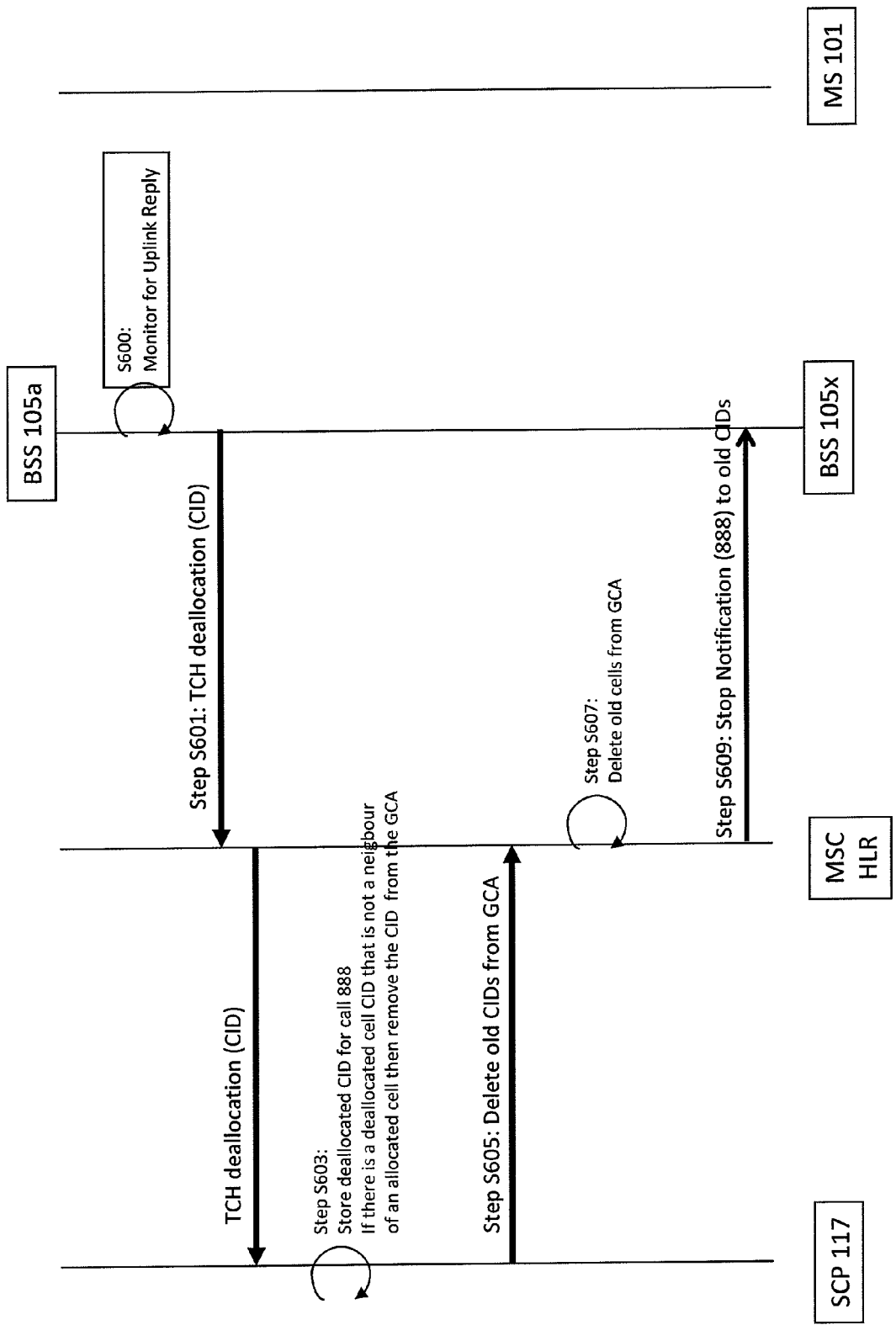
FIG. 6 is a timing diagram showing communication between various of the components shown in FIG. 1 in relation to movement of a member of the group call from an old cell according to an embodiment of the invention.

In addition to adding cells to the Group Call Area as the group call moves, cells that were previously part of the Group Call Area are deleted therefrom. Referring to FIG. 6, deletion of cells from the Call Group Area is conveniently performed on the basis of standard signalling messages, namely a traffic deallocation message. This message will be transmitted by BSS 105a when the train (and thus mobile station 101) has moved out of cell 100a, because once the train has moved into cell 100b there are no mobile stations in cell 100a that can respond to the notification messages having Group Call Area (00175) and group ID (888). Once the traffic deallocation message has been received by the SCP 117, the entry corresponding to cell ID 100a is updated with the status of the traffic channel. In addition the SCP 117 searches for cells listed in the Group Call Area that have deallocated status and that are not adjacent the currently active cell(s) (i.e. cell(s) for which the traffic channel is active). Referring back to FIG. 3, in the present example the currently active cell is 100b, and there are three unactive, or passive, cells 100x, 100a, 100c. Since cell 100x is not a neighbour of the currently active cell 100b, it is removed from the Call Group Area (step 603) by the SCP 117. A message is then sent to the MSC 107, instructing the MSC 107 to delete cell 100x from the Group Call Area that it stored at step 411; this deletion is effected at step S607 and the MSC 107 then proceeds to instruct the BSS 105x corresponding to the deleted cell to stop sending notification messages via the signalling channel NCH (step S607).

As described above, there will be as many active cells as there are participants of the group call that occupy different cells; thus whilst in the example shown in FIG. 3 it is assumed that all participants of the group call are present in a single cell at any one time, for cases where the train is long and/or participants are distributed along the length of the train, it can expected that there will be several active cells and a commensurately greater number of passive cells than those shown in FIG. 3.

Figure 5:
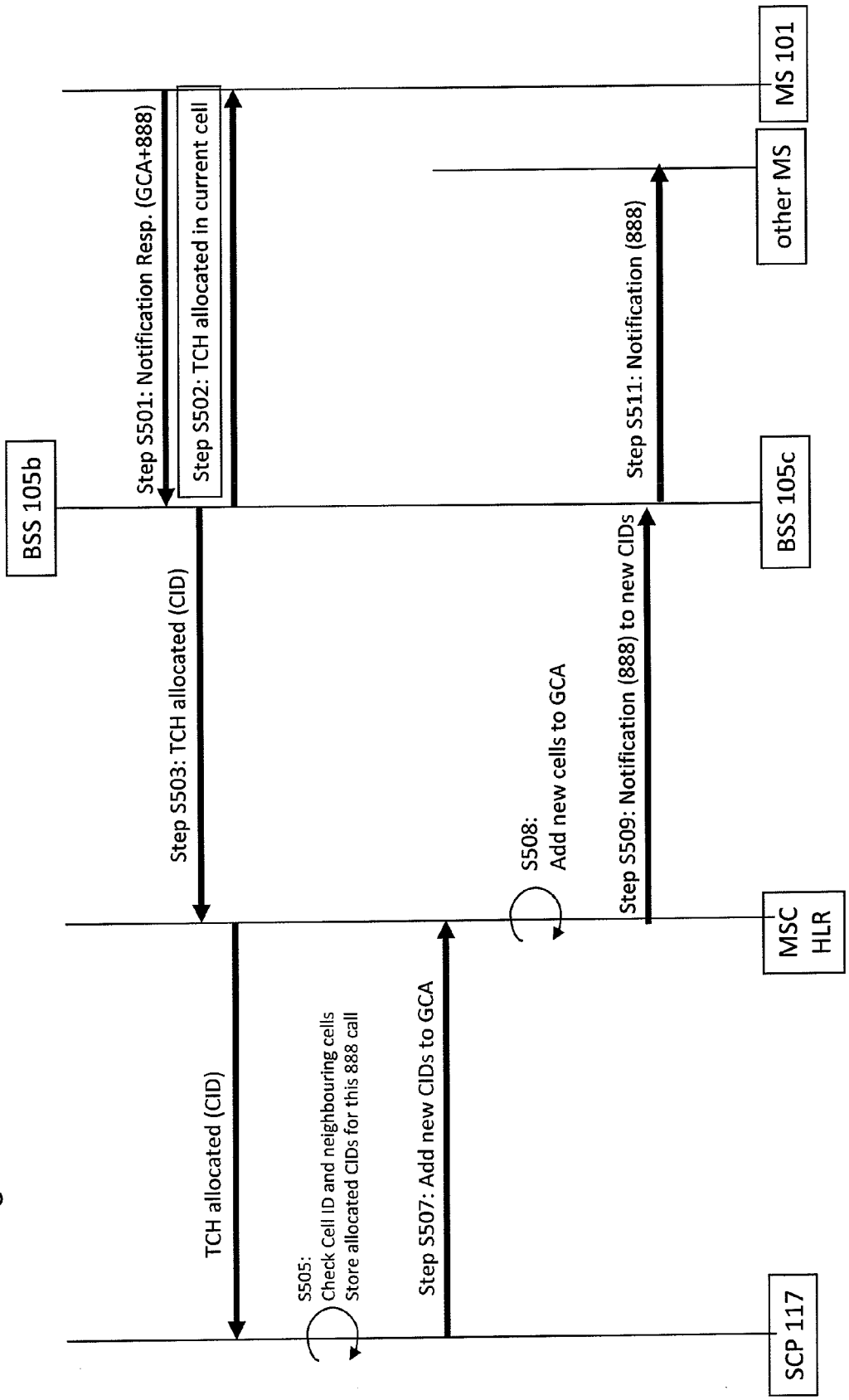
FIG. 5 is a timing diagram showing communication between various of the components shown in FIG. 1 in relation to movement of a member of the group call into a new cell according to an embodiment of the invention.

It will be appreciated that the steps shown in FIGS. 5 and 6 will be repeated in respect of each cell that the group call enters so as to ensure that the activation of traffic channels in any given active cell is synchronised with the activation and deactivation of signalling channels in prospective, current and previous passive cells. In summary, and by way of generalising the ongoing group call management process, allocations and deallocations of voice channels are reported to the MSC 107 by the BSS 105a . . . 105c. Voice channel allocations are used by the MSC 107 to request the service node 117 to find the adjacent cells of the active cell (i.e. the cell in which the voice channel is active). These cells are then added to the Group Call Area. Deallocation information is used to remove all cells from the Group Call Area in case they are no longer neighbour cells of a cell in which a voice channel is currently allocated.

Figure 7:
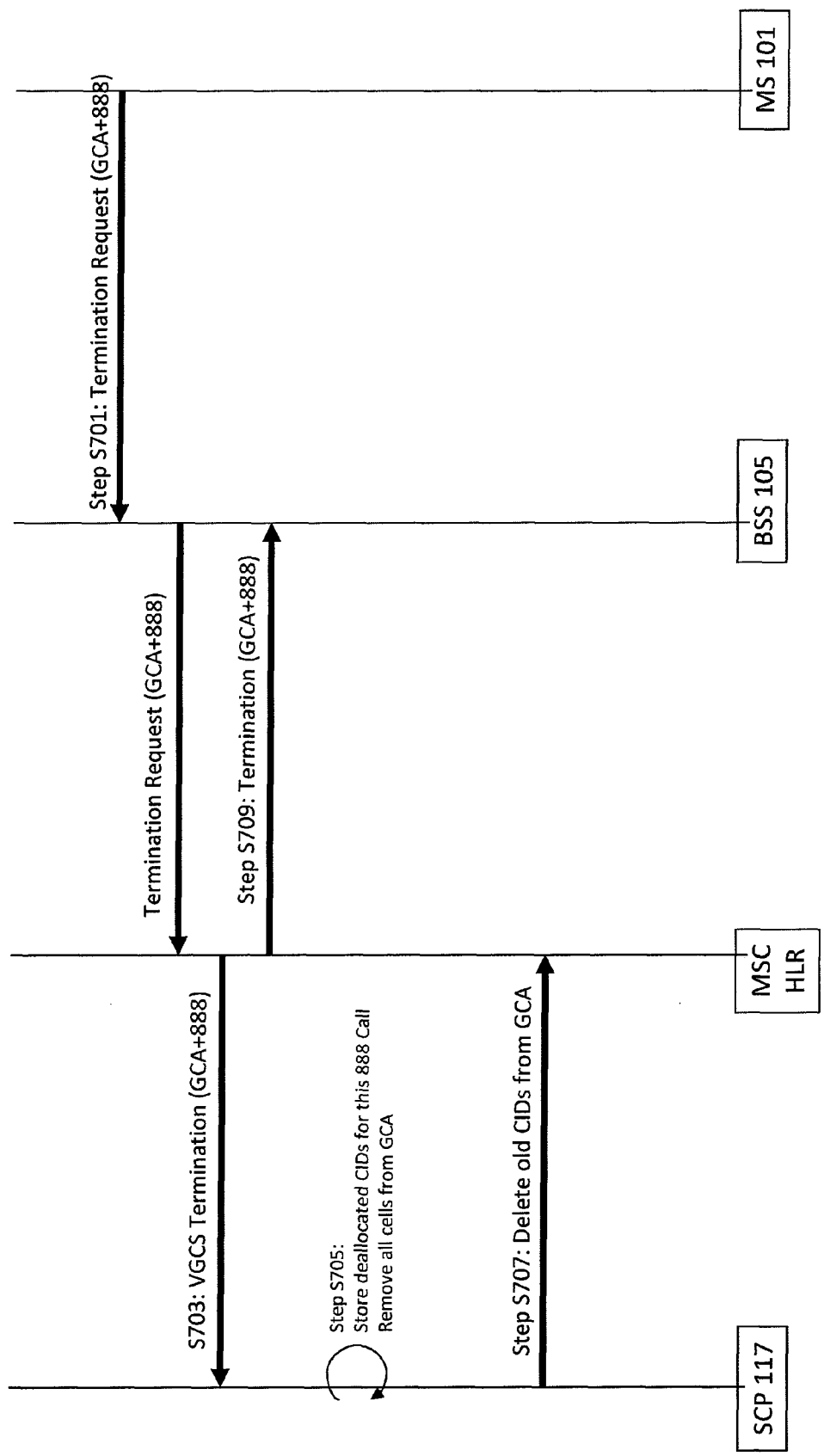
FIG. 7 is a timing diagram showing communication between various of the components shown in FIG. 1 when coordinating termination of a group call.

When a group call is terminated, various messages are passed between the various mobile and network entities, as will now be described with reference to FIG. 7. Typically the group call will be terminated by the mobile station 101, by means of a standard termination request message (step S701). For illustration purposes it will be assumed that the termination request is received when the mobile station is in cell 100b, so that this message is received from the mobile station

101 by BSS 105b. The BSS 105b relays the termination request message to the MSC 107, which creates a group call termination instruction identifying the Group Call Area (00175) and group ID (888) and transmits this message to the SCP 117. In response the SCP 117 removes all cells from the mapping corresponding to this Group Call Area and Group ID (step S705); in addition, the SCP 117 sends an instruction to the MSC 107, instructing the MSC 107 to delete the cells from the Group Call Area associated with this group call (step S707). When received, the MSC 107 identifies the group call that it created at step 411 and sends termination messages to all BSS 105a, 105b, 105c currently listed against that Group Call Area (step S709) so as to effect termination of any traffic and signalling channels.

From the foregoing it can be seen that in addition to conventional functionality specified in GSM Standard 03.68, the SCP 117 is configured with a means for transmitting an instruction to the MSC 107 to define a Group Call Area including a plurality of neighbouring cells (e.g. step S409), and to send instructions to add and delete cells to and from the Group Call Area (e.g. S507, S605). The SCP 117 is additionally configured to receive traffic allocation and deallocation messages in relation to the neighbouring cells, these traffic channel messages triggering updates to the register holding details of group calls (S407, S505, S603) and causing the SCP 117 to send the afore-mentioned messages to the MSC 107.

The MSC 107 is similarly equipped with bespoke functionality in the form of means for updating a repository holding details of group calls and cells relating thereto in the event that a group call is determined to be of the dynamic type (i.e. having a number between 880-888 in the current example); the MSC 107 can add to, and delete from, the cells belonging to a Group Call Area upon instruction from the SCP 117 as shown e.g. at step S411, 508, 607. In addition, the MSC 107 is configured to transmit traffic allocation and deallocation instruction messages to the SCP 107 (these being received from the BSS using a standard uplink reply/notification feature). This additional functionality can be implemented as software running on, and storage accessible to, the switch 107 and SCP 117.

In addition the mobile stations are equipped with means to discriminate between dynamic group calls (i.e. group calls having Ids between 880-888) on the basis of Group Call Area (i.e. group identifiers that are unique for the group—in the foregoing example this is the train identity). This functionality can either be implemented on the mobile phone or on the removable module (SIM) associated with the subscription of the user. Such functionality is similar to the filtering of Shunting Groups in the GSM-Railway (GSM-R) environment. This therefore enables any given mobile station to participate in two dynamic group calls having the same group ID (e.g. 888) provided the mobile station has previously registered for each of the groups (i.e. in respect of each unique identifier).

It will be appreciated from the foregoing that by using an identifier to define the Group Call Area embodiments of the invention enable groups having the same group number to co-exist distinct from one another within the same group of cells. This is an improvement of the prior art, in which there is either no means of distinguishing one Group Call Area from another Group Call Area if their physical locations overlap (with the result that the groups are joined into a single group), or the joining of a group is controlled by which notification channel a mobile station communicates with first (with the result that selection of a group by the mobile station is essentially a random process).

Additional Details and Modifications

Whilst in the foregoing embodiment the use of a unique group identifier is described in the context of dynamic group calls, this aspect of the invention could also be utilised in respect of static group calls, since it provides a means of discriminating between different group calls existing in a given area. Thus while the foregoing embodiment relates to the coordination of group calls in the context of train travel, embodiments of the invention could alternatively be employed in environments that involve mobile and static group calls. Examples include groups of workers in a factory, emergency services (in particular sections of the police force or fire brigade), teams participating in sporting events such as sailing, groups of archaeologists distributed over a given area, or groups of construction workers distributed over a construction site etc.

The above embodiments are to be understood as illustrative examples of the invention. Other embodiments are envisaged, for example in relation to group calls involving more than one MSC. In such a scenario one MSC is designated as controller of the group call: the Anchor MSC. If the Group Call Area includes cells which are not under the control of the Anchor-MSC, the MSC for those cells also participate in the group call as a Relay MSC. This enables movement of the group call as and when a different MSC becomes available.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of managing a group call involving a plurality of mobile communications devices, said plurality of mobile communications devices being registered with a telecommunications network via a serving node, the serving node being operable to transceive data to and from a plurality of radio access nodes so as to communicate with said registered mobile communications devices, in which at least a first of said radio access nodes has established a data communications channel with a mobile communications device of the plurality for conducting the group call, the method comprising:

identifying a radio access node adjacent to the first radio access node;

the serving node receiving a service response message from a network node, said service response message comprising data identifying a Group Call Area;

the serving node defining the Group Call Area based upon the first radio access node and the adjacent radio access node;

the serving node transmitting signalling instruction messages to said radio access nodes defined by the Group Call Area, said signalling instruction messages comprising instructions to establish a signalling channel;

establishing the signalling channel, prior to establishing a traffic channel, within a cell corresponding to said adjacent radio access node, said signalling channel having an identifier corresponding to the Group Call Area;

broadcasting a notification message for the group call within the Group Call Area using at least said signalling channel;

receiving a notification response message having the identifier corresponding to the Group Call Area from a mobile communication device; and establishing the traffic channel for use in the group call within the cell corresponding to said adjacent radio access node.

2. A method according to claim 1, further comprising creating a data communications channel in response to a signalling request message from the mobile communications device identifying the adjacent radio access node, whereby to define said adjacent radio access node as the or a further first radio access node.

3. A method according to claim 2 including identifying a plurality of radio access nodes adjacent the first radio access node, the Group Call Area being defined on the basis of said first and plurality of adjacent radio access nodes.

4. A method according to claim 3 including identifying a radio access node in the Group Call Area not adjacent to said first radio access node, and removing the radio access node so identified from the Group Call Area.

5. A method according to claim 1, including identifying said radio access node adjacent the first radio access node on the basis of a pre-stored cell configuration map.

6. A method according to claim 5, in which said identifying of said radio access node adjacent the first radio access node is performed at a Service Control Point.

7. A group call management system for managing a group call involving a plurality of mobile communications devices, said plurality of mobile communications devices being registered with a telecommunications network via a serving node, the serving node being operable to transceive data to and from a plurality of radio access nodes so as to communicate with said registered mobile communications devices, in which at least a first of said radio access nodes has established a data communications channel with a mobile communications device of the plurality for conducting the group call, the group call management system comprising:

a network node configured to identify one or more radio access nodes adjacent to the first radio access node in response to a service request message identifying the first radio access node;

wherein the serving node is configured to receive a service response message from the network node, said service response message comprising data identifying a Group Call Area;

wherein the serving node is further configured to create the Group Call Area based upon the first and adjacent radio access nodes;

wherein the serving node is further configured to transmit signalling instruction messages to said radio access nodes defined by the Group Call Area, said signalling instruction messages comprising instructions to establish the signalling channels; and wherein at least some of said adjacent radio access nodes are configured to:

establish a signalling channel prior to establishing a traffic channel, said signalling channel having an identifier corresponding to the Group Call Area, broadcast a notification message for the group call within the Group Call Area using at least said signalling channel, receive a notification response message having the identifier corresponding to the Group Call Area from a mobile communication device, and establish a traffic channel for use in the group call within the cell corresponding to said adjacent radio access node.

8. A group call management system according to claim 7, wherein each said adjacent radio access node is arranged to create a data communications channel in response to a signalling request message from the mobile communications device identifying the adjacent radio access node, whereby to define said adjacent radio access node as the or a further first radio access node.

9. A group call management system according to claim 8, wherein the network node is arranged to identify a plurality of radio access nodes adjacent the first radio access node, the Group Call Area being defined on the basis of said first and plurality of adjacent radio access nodes.

10. A group call management system according to claim 7 wherein the network node is arranged to identify a radio access node in the Group Call Area not adjacent to said first radio access node, and remove the radio access node so identified from the Group Call Area.

11. A group call management system according to claim 7, including identifying said radio access node adjacent the first radio access node on the basis of a pre-stored cell configuration map.

12. A group call management system according to claim 11, in which said identifying of said radio access node adjacent the first radio access node is performed at a Service Control Point.

* * * * *